Figures 1, 2:
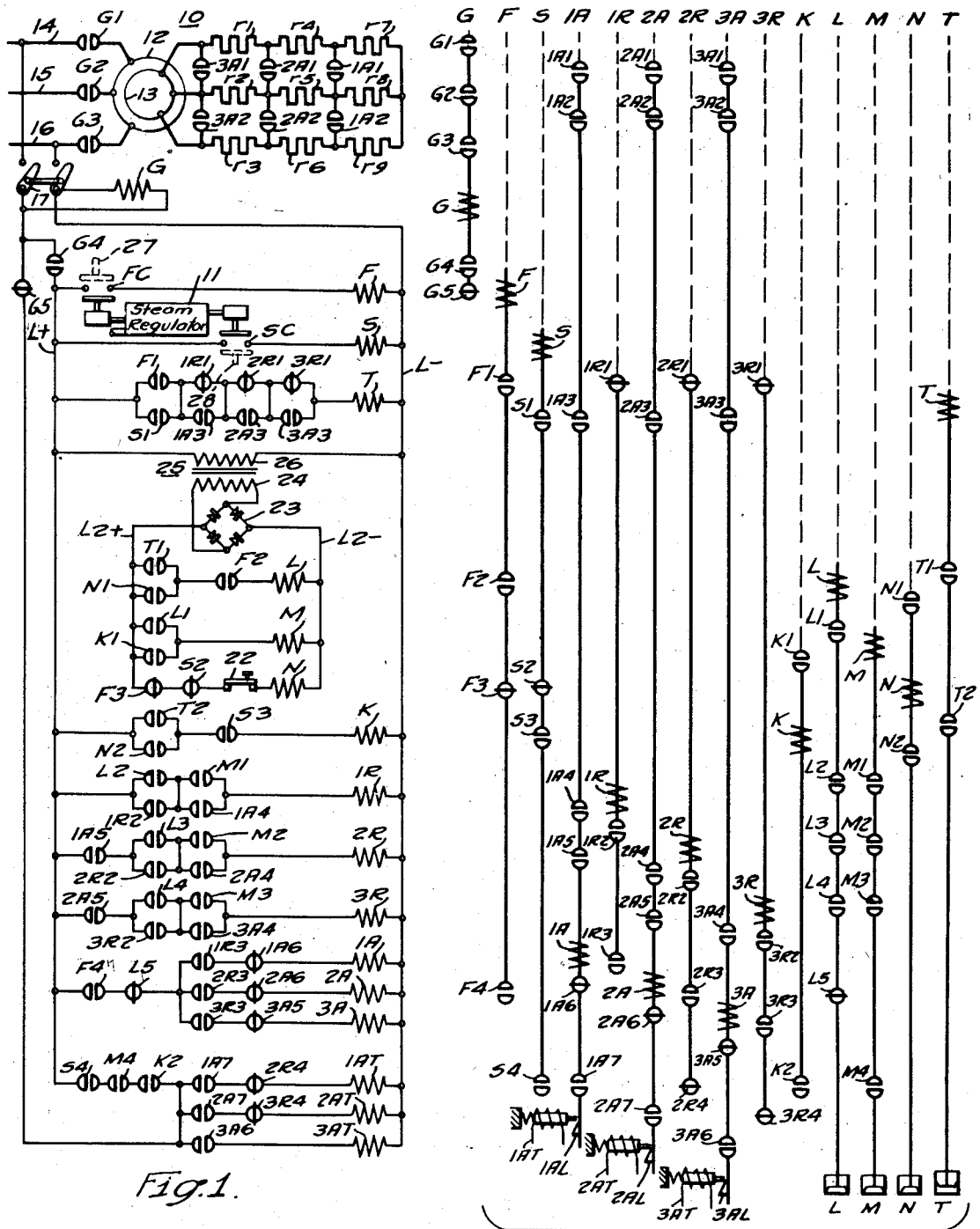

INVENTOR
Jean V. Kresser.

Patented May 28, 1946

2,400,999

UNITED STATES PATENT OFFICE 2,400,999

CONTROL SYSTEM FOR ELECTRIC MOTORS

Jean V. Kresser, San Francisco, Calif., assignor to Westinghouse Electric Corporation, East Pittsburgh, Pa., a corporation of Pennsylvania Application January 15, 1943, Serial No. 472,446

7 Claims. (Cl. 172—274)

My invention relates to control systems for electric motors and, more particularly, to systems for controlling the speed and output of wound rotor induction motors.

One object of my invention is to provide a system for automatically controlling the torque or speed of wound rotor induction motors in response to the desired activity of the means operated by the motors.

Another object is to provide a system of this character in which the speed will be held automatically, substantially constant regardless of variations in the load torque for the speed and output of the motors and which will be caused to change automatically when conditions require such change.

A further object is to provide a control system of the character indicated which shall require only standard relays and contactors and which shall be simple and inexpensive to install, operate and maintain in operation.

It is also an object to provide a control system of this character in which good flexibility in the method of operation is available.

Other features and advantages of my invention will become apparent in the following description taken in conjunction with the accompanying drawing in which:

Figure 1 embodies a straight line diagram of the circuits and apparatus for my improved control system for wound rotor induction motors; and Fig. 2 is a key representation of the relays and contactors embodied in Fig. 1 illustrating the coils and their associated contact members disposed in horizontal alignment with their positions in the straight line circuit diagram so that their locations therein may be readily determined.

Although my improved system may be used in connection with any plant or apparatus or external means where it is desired to control the speed or output of the motors to effect a certain desired operation of the plant, apparatus, or external means, it will, for convenience, be described in connection with a steam plant where it is used to so control a motor for operating an induced draft fan for a boiler in the steam plant as to maintain the steam in the boiler at a predetermined pressure.

Referring more particularly to the drawing, I have illustrated a wound rotor induction motor 10 for operating an induction draft fan on a boiler (not shown), a steam pressure responsive device or regulator 11 which is connected to boiler served by the fan motor, and a control system represented by the supply conductors L+ and L— for controlling the motor in response to the operation of the steam pressure device. It will be understood that the pressure device represents any external load or condition which it is desired to maintain at a predetermined value.

The motor 10 is provided with a stator 12 and a rotor 13. The rotor is provided with a plurality of secondary resistors $r1$ to $r9$, inclusive, by means of which the speed and output of the motor may be controlled.

The starter of the motor may be connected for energization to a three-phase power circuit 14, 15 and 16 by a control switch G. A manually operated main switch 17 is provided for connecting the coil of the switch G to the supply conductors 14 and 16. When switch G is energized, it closes its contacts G1 to G5 to start the motor and energize the control conductors L+ and L— for energizing the control apparatus.

The steam pressure device 11 is responsive to an external means such as the steam pressure in the boiler and is provided for controlling a "fast" master switch FC and a "slow" master switch SC in the control system. The pressure device may be adjusted for any value at which it is desired to maintain the steam pressure. When the pressure exceeds such predetermined value, the device closes the switch SC and keeps it closed as long as the pressure exceeds that value. When the pressure drops to the desired value, the device opens the switch SC. When the pressure drops below the selected value the pressure device closes switch FC and keeps it closed as long as the pressure stays below that selected value. When the pressure rises to the selected value, the device opens the switch FC. When both switches FC and SC are open, the control system maintains the condition it was in at the time either switch opened.

In the control system, a plurality of accelerating and decelerating contactors 1A, 2A and 3A are provided for rendering the resistors $r1$ to $r9$ effective or ineffective in the rotor circuit to control the speed and output of the motor. The contactor 1A is provided with its closing coil to move it to its closed position, a latching means 1AL, and a tripping coil 1AT for releasing the latching means. When its closing coil is energized, the contactor moves to its closed position. In doing this it opens its back contacts 1A6 in its energizing circuit but at the same time operates its holding latch 1AL to hold it in its closed position. When it is desired to open the contactor 1A, its tripping coil 1AT is energized to release the latching means 1AL and thereby permit the contactor to return to its open position to which it may be biased by any suitable means (not shown). The contactors 2A and 3A are similar to the contactor 1A.

A pair of time delay control relays L and M are provided for controlling the contactors 1A, 2A and 3A. Each of these relays closes instantly when it is energized. When it is deenergized, it delays its opening for a short period of time. The time delay is provided in order to avoid races between the relays and it may be of the order of say, a quarter or half of a second. An assisting relay K is associated with the relay M. The time delay relays L and M operate when an increase in motor speed is being effected and the relays K and L operate when a decrease in speed is being effected.

A plurality of auxiliary relays 1R, 2R and 3R are associated with the contactors 1A, 2A and 3A and the time delay relays L and M for causing sequential operation of the contactors when one of the master switches is closed and for maintaining said sequential selection while that master switch remains closed.

A timer or timing relay T is provided for effecting a delay of a predetermined length of time after a contactor is operated before the next contactor is operated. When the timer is energized, it closes its contacts after an adjustable time delay. When it is deenergized, it opens its contacts practically instantaneously. It may be of the synchronously driven type, ratchet type or any other suitable type, and it should be adjusted to give the time delay desired between the sequential increases or decreases of the value of the secondary resistors included in or excluded from the rotor circuit.

When the control system is operating to increase the speed of the motor, the timer T is started by the next contactor A to be operated and is stopped by the auxiliary relay R associated with the next contactor to be closed. When the system is decreasing the motor speed, the timer T is started by the auxiliary relay R of the contactor opened and is stopped by the next following contactor to be opened.

A timer control device such as a relay N is provided for selectively avoiding the effect of the timer T when the system first starts a sequential operation of the contactors so that the secondary resistance will be changed promptly when either one of the master switches is first closed. A hand-operated switch 22 is disposed in the circuit of the relay N so that it may be eliminated from the system when it is desired to introduce the time delay of the timer T before the first change in the secondary resistance occurs in response to operation of either of the master switches by the pressure device. Whichever of these two methods is used depends upon the requirements of the plant to be controlled. When the relay N is rendered ineffective its contacts N1 and N2 in the circuits of the relays L and K remain open so that these relays remain subject only to the action of the timer T upon starting a sequential operation of the contactors. The relay N closes promptly when it is energized but has a delay of say, one quarter or half of a second when it opens.

The relays L, M and N are illustrated as direct current relays operating on a circuit L2+ and L2− supplied with energy by a copper oxide rectifier 23 connected to the secondary coil 24 of a transformer 25, the primary coil 26 of which is supplied with energy from the supply conductors L+ and L−. However, it will be appreciated that any suitable time-delay-on-opening relays may be used.

A "fast" relay F disposed to be energized by the closing of the "fast" master switch FC by the pressure regulator 11 is provided for starting the timer T and energizing the time delay relay L to effect the sequential step-up closing operation of the contactors while the master switch FC remains closed.

A "slow" relay S disposed to be energized by the closing of the "slow" master switch SC by the pressure regulator 11 is provided for starting the timer T and energizing the assisting relay K to effect sequential step-down opening operation of the contactors to decrease the speed of the motor while the master switch SC remains closed.

An assumed operation of the system described may be effected as follows: It will be assumed that the regulator 11 is in the position to which it is adjusted for the desired pressure in the boiler, with the switches FC and SC, which it controls, in open condition, and that the main switch 17 is closed to start the motor 10 and the control system in operation.

The closing of the switch 17 energizes the coil of the control switch G by connecting it to the supply conductors 14 and 16. Thereupon, the energized switch G closes its contacts G1, G2 and G4 and opens its contacts G5. The closed contacts G1, G2 and G3 connect the stator 12 of the motor to the supply conductors 14, 15 and 16 and the closed contacts G4 connect the supply conductors L+ and L− to the supply conductors 14 and 16 for energizing the control circuit. The energization of the control circuit energizes the transformer 25 and starts the rectifier 23 to supply the conductors L2+ and L2− with energy, thereby energizing the timer control device N, through the circuit

L2+, F3, S2, 22, N, L2−

It will be assumed now that the steam in the steam plant falls below the desired pressure and that, consequently, the steam regulator 11 is operated by the lowered pressure of the steam to close the master "fast" switch FC to cause the control system to increase the speed of the motor for driving the draft fan at a higher speed to cause increased combustion in the boiler and thus increase the steam pressure.

The closing of the master switch FC energizes the "fast" relay F by the circuit

L+, FC, F, L−

The energized relay F closes its contact members F1, F2, and F4 and opens its contacts F3. The closing of the contacts F1 energizes the timer T by the circuit

L+, F1, 1R1, 2R1, 3R1, T, L−

In this condition, the timer starts operation and after the expiration of its predetermined time delay it will close its contact members. The closing of the contacts F2 completes a circuit for the control relay L which extends L2+, N1, F2, L, L2−.

The opening of the contacts F3 deenergizes the time delay relay N and, after the expiration of its predetermined delay, that relay will open its contacts. The relay N is used to short-circuit the contacts of the timer at the start of a sequential operation of the contactors and thus permit the prompt operation of the first contactor to be operated in a sequence set up.

The energized relay L closes its contacts L1 and thereby energizes the time delay relay M by the circuit

L2+, L1, M, L2—

The energized relay M closes its contacts M1 and thereby energizes the sequential relay 1R by the circuit

L+, L2, M1, 1R, L—

The energized relay 1R opens its contacts 1R1 in the timer circuit thus stopping the energization of the timer T.

The energization of the relay 1R also assists in preparing certain circuits for the sequential operation of the contactors.

It will be assumed now that the timer control relay N, after its delayed period, opens its contacts N1, thereby deenergizing the relay L. The deenergized relay L, after its time delay, opens its contacts L1, thereby deenergizing the relay M which times out later. The relay L also closes its back contacts L5, thereby energizing the actuating coil of the contactor 1A by the circuit

L+, F4, L5, 1R3, 1A6, 1A, L—

The energized contactor 1A moves to its uppermost position and is latched in such position by its latch 1AL. In moving to its actuated position, the contactor opens its contacts 1A6 in its own energized circuit but the latch prevents it from opening.

The energized contactor 1A also closes its contacts 1A1 and 1A2 in the resistor circuit of the motor 10, thereby short-circuiting the resistors r7, r8, r9 and rendering them ineffective in the motor circuit. This operation causes the motor to increase its speed.

It will be observed that in this particular method of operation, the hand-operated switch 22 is closed and that the timer control device N was temporarily energized at the start of the operation to render the timer ineffective to delay the operation of the first contactor to be operated.

The operation of the contactor 1A also closes its contacts 1A3 thereby energizing the timer by the circuit

L+, F1, 1A3, 2R1, 3R1, T, L—

The timer now starts in operation and will close its contacts after the expiration of its predetermined time delay. Upon the expiration of this time delay, the timer closes its contacts T1, thus again energizing the time delay relay L by the circuit

L2+, T1, F2, L, L2—

The energized relay L then recloses its contacts L1 thus energizing the time delay relay M by the circuit

L2+, L1, M, L2—

The energized relay M then closes its contacts M2, thereby energizing the selective relay 2R by the circuit

L+, 1A5, L3, M2, 2R, L—

The energized relay 1A also closes its contacts 1A4 to provide a holding circuit through the contacts 1R2 and 1A4 for the relay 1R. The energized relay 1A also closes its contacts 1A5 to prepare an actuating circuit for the sequence relay 2R.

The energized relay 2R opens its contacts 2R1 thus deenergizing the timer T which thereupon opens its contacts T1 thus deenergizing the relay L. After the expiration of the predetermined time, the deenergized relay L closes its back contacts L5 and energizes the contactor 2A by the circuit

L+, F4, L5, 2R3, 2A6, 2A, L—

The energized contactor 2A moves to its closed position in which it is held by its latch 2AL. In this position the contactor closes its contacts 2A1 and 2A2, thereby short-circuiting the resistors r4, r5 and r6 in the motor circuit, thus increasing the speed of the motor.

The closed contactor 2A also closes its contacts 2A3 and thereby energizes the timer T by the circuit

L+, F1, 1A3, 2A3, 3R1, T, L—

The timer T is thus energized by the contactor 2A to prevent the operation of the contactor 3A until a predetermined length of time after the operation of the contactor 2A, thus providing a predetermined time delay between the operations of the contactors.

It will be assumed now that the timer T has reached the end of its time delay and recloses its contacts T1 thus again energizing the control relay L by the circuit previously described. The energized relay L closes its contacts L1 thus again energizing the control relay M by the circuit previously described. The energized relay M closes its contacts M3 thus energizing the sequence relay 3R by the circuit

L+, 2A5, L4, M3, 3R, L—

The energized sequence relay 3R opens its contacts 3R1 and thus deenergizes the timer T. The deenergized timer T opens its contacts T1 thus again deenergizing the time control relay L and that relay, after its predetermined time delay, recloses its back contacts L5 and thus energizes the contactor 3A by the circuit

L+, F4, L5, 3R3, 3A5, 3A, L—

The energized contactor 3A closes its contacts 3A1 and 3A2 in the resistor circuit, thereby short-circuiting the resistors r1, r2 and r3, thus increasing the speed of the motor 10 to increase the speed of the draft fan (not shown) and thereby restore the boiler to its desired steam pressure.

The energized relay 3A also closes its contacts 3A3, thereby again starting the timer by energizing it with the circuit

L+, F1, 1A3, 2A3, 3A3, T, L—

The energized timer, after its usual time delay, closes its contacts T1 to again energize the control relay L by the circuit previously described. The energized relay L energizes the relay M but there is no contactor to be operated by that relay in the present installation and therefore no new operation is effected.

It is understood that this chain of contactors and sequence relays can be extended as desired to provide as many changes in the resistor circuit as may be desired to control the speed of the motor.

By the foregoing description, it will be seen that when the steam pressure falls below the point for which the regulator has been set, the regulator closes the "fast" switch to cause an increase in the speed of the fan motor, and that the closed "fast" switch causes the control relays and the sequence relays to respond by closing the contactors in spaced apart sequence to eliminate the resistors in a step-by-step action to gradually increase the speed of the motor.

It will be assumed now that the increased speed of the fan motor 10 has restored the boiler pressure to the desired amount for which the steam pressure regulator is set and that it thereupon opens the "fast" switch FC to stop any further change in the speed of the motor. The opening of the switch FC deenergizes the fast relay F, which in turn opens its contacts F2, deenergizes the time delay relay L, opens its contacts F1 to deenergize the timer T and opens its contacts F4 in the circuit of the closing coil of the contactors 1A, 2A and 3A. The deenergized relay F also closes its back contacts F3 and thereby reenergizes the timer control relay N by the circuit previously described.

As long as the steam pressure stays at its present point, the control system and the motor will stay in their present condition of operation.

It will be assumed now that the steam pressure in the boiler plant rises above the pressure point for which the regulator is set and that the regulator operates to close the "slow" switch SC to reduce the speed of the motor 10 on the draft fan so as to reduce the steam pressure. The closing of the switch SC energizes the "slow" relay S which closes its contacts S1, S3 and S4 and opens its contacts S2. The opening of the contacts S2 deenergizes the timer control relay N which will move to open position after its predetermined time delay. The closing of the contacts S1 energizes the time, which will not close until after the expiration of its predetermined time, by the circuit

L+, S1, 1A3, 2A3, 3A3, T, L— but its action may be ignored because relay N short-circuits its contacts at present. The closing of the contacts S3 energizes the assisting relay K by the circuit

L+, N2, S3, K, L—

The energized relay K closes its contacts K1, thereby energizing the time delay relay M by the circuit

L2+, K1, M, L2—

The energized relay M closes its contacts M4 and thereby energizes the tripping coil 3AT of the contactor 3A by the circuit

L+, S4, M4, K2, 3A6, 3AT, L—

The tripping coil of the contactor 3A releases the latch 3AL and the deenergized contactor moves to its open position thus opening its contact members 3A1 and 3A2 which operate to reinsert the resistors r1, r2 and r3 in the circuit of the motor 10 thus reducing the speed of the motor to reduce the operation of the draft fan.

The opening of the contactor 3A also opens the contacts 3A3 in the timer circuit and deenergizes the timer T. While this operation has proceeded, the time delay for the timer control device N has elapsed and that relay has opened thus opening its contacts N2 and thereby deenergizing the relay K which will move to its open position after its predetermined time delay on opening. When the relay K opens, it opens its contacts K1 and thereby deenergizes the control relay M. After the expiration of its normal time delay, the relay M opens its contacts M3, thereby deenergizing the sequence relay 3R which closes its back contacts 3R1 and thus again energizes the timer by the circuit

L+, S1, 1A3, 2A3, 3R1, T, L—

After due time, the timer closes and thus again reenergizes the relay K by the former circuit described. The timer now provides a time delay between the opening of the contactor 3A and the next contactor 2A. The energized relay K closes its contacts K1 and thus energizes the relay M by the circuit previously described. The energized relay M closes its contacts M4 and thereby energizes the tripping coil 2AT of the contactor 2A by the circuit

L+, S4, M4, K2, 2A7, 3R4, 2AT, L—

The energized contactor 2A opens its contacts 2A1 and 2A2 and thereby reinserts the resistors r4, r5 and r6 in the resistor circuit of the motor 10.

If the steam pressure regulator operates to open the "slow" switch SC at this point in the operation of the plant, the contactor 1A will stay in operation and the speed of the motor 10 will remain at its present rate because the "slow" switch SC will open and thus stop further energization of the control relays.

However, it will be assumed that the steam pressure still remains too high and therefore that the system continues with the switch SC closed and the "slow" relay S energized. Under these conditions the operation of the contactor 2A also opens its contacts 2A3 thereby deenergizing the timer T. The deenergization of the timer T opens its contacts T2 and thus deenergizes the assisting relay K which in turn opens its contacts K1 and thus deenergizes the time relay M.

The deenergization of the relay M causes it to open after its predetermined time delay and it thereupon opens its contacts M2 and thus deenergizes the selective sequence relay 2R which in turn opens its contacts 2R1 and thus starts the timer T by closing its back contacts 2R1 so that the circuit for the timer now extends

L+, S1, 1A3, 2R1, 3R1, T, L—

After the expiration of the predetermined delay for the timer, it closes its contacts T2 thus energizing the assisting relays K by the circuit previously described. The energized relay K in turn closes its contacts K1 and thus energizes the relay M by the circuit previously described which closes its contacts M4 and thus energizes the tripping coil 1AT of the contactor 1A by the circuit

L+, S4, M4, K2, 1A7, 2R4, 1AT, L—

The energized coil 1AT operates the latch 1AL to release the contactor 1A which thereupon opens its contacts 1A1 and 1A2, thus reinserting the resistors r7, r8 and r9 in the circuit of the motor 10 and thereby further decreasing the speed of the motor. The opening of the contactor 1A opens its contacts 1A3 thus deenergizing the timer T which in turn opens its contacts T2 thus deenergizing the assisting relay K which in turn deenergizes the time delay relay M. After the expiration of the predetermined time delay for the relay M, it opens its contacts M1 thus deenergizing the sequence relay 1R.

It will be assumed now that the motor speed has been decreased to such an extent that the high pressure of the boiler is reduced to the desired point and that it thereupon operates the regulator to open the master "slow" switch SC thus deenergizing the "slow" relay S and returning the system to its normal condition. Inasmuch as both of the switches FC and SC are now open, both of the relays F and S are deenergized and their contacts F3 and S2 are closed thus energizing the timer control relay N for the next operation.

By the foregoing operation it will be apparent that the response of the regulator 11 to a decrease or an increase in the steam pressure will cause it to so operate the "fast" relay F and the "slow" relay S as to effect an increase or a decrease in speed of the motor in response to the operation of the regulator in keeping the boiler plant in the desired predetermined condition.

It will also be apparent that the contactors will be operated in sequence; that the timer will introduce a predetermined delay in each sequential operation and that the system will remain in any condition to which it is operated until the steam pressure moves the regulator above or below its setting when it will respond to the change.

When it is desired to operate the system without the instantaneous effect at the start secured by the relay N, that relay may be rendered ineffective by opening the hand switch 22. When the relay N is eliminated from the system, the operation of the first contactor after the regulator operates for a change in the motor speed, the operation of the first contactor will be delayed by the delayed closing action of the timer T, because neither the relay L nor the relay K can be energized by either the "fast" or the "slow" relay until their circuits are prepared by the timer T. The use of the relay N and the hand-operated switch 22 provide a convenient means by means of which either of two methods of operation may be utilized in accordance with the conditions to be met.

It will be apparent further that the regulator 11 may be disconnected and the master switches FC and SC operated manually by the push buttons 27 and 28 to step the system up or down for increasing or decreasing the speed of the motor as desired. As long as either switch is held closed by hand operation, the control system will follow that operation. If the switch FC or the switch FS is operated by hand for an instant and released, it will cause the control system to step up or step down one point in the direction for which the switch is closed temporarily. If it is desired to have the system operate for more than one step, the switch may be held closed for a sufficient period to allow the system to step up or down until the desired speed of the motor is secured.

Although I have illustrated and described only one specific embodiment of my invention, it is to be understood that many changes therein and modifications thereof may be made without departing from the spirit and scope of the invention.

I claim as my invention:

1. In a motor control system, an electric motor, a plurality of resistors connected in circuit with the motor, a plurality of contactors for controlling the connection of the resistors in the motor circuit to control the speed of the motor, control means for causing operation of the contactors to control the connection of the resistors in the motor circuit, means responsive to operation of the control means for causing the operation of the contactors to follow a predetermined sequence in operation, means responsive to operation of the control means for delaying the sequential operation of each contactor for a predetermined length of time, and means responsive to operation of the control means for rendering the delaying means ineffective for the first contactor to be operated in a new sequential operation.

2. In a motor control system, an electric motor, a plurality of resistors connected in circuit with the motor, a plurality of contactors for controlling the connection of the resistors in the motor circuit to control the speed of the motor, control means for causing operation of the contactors to control the connection of the resistors in the motor circuit, means responsive to operation of the control means for causing the operation of the contactors to follow a predetermined sequence in operation, means responsive to operation of the control means for delaying the sequential operation of each contactor for a predetermined length of time, means responsive to operation of the control means for rendering the delaying means ineffective for the first contactor to be operated in a new sequential operation, and a timer for delaying the sequential operation of each contactor for a predetermined length of time, a timer control device for rendering the timer ineffective to delay operation of the first contactor to be operated in a sequential operation of the contactors, and manually operative means for rendering the timer control device ineffective.

3. In a motor control system, a wound rotor induction motor having a plurality of resistors disposed in circuit with its rotor, a plurality of contactors for controlling the connection of the resistors in the rotor circuit to control the speed of the motor, a plurality of control relays for effecting operation of the contactors, a plurality of auxiliary relays associated with the control relays for effecting sequential operation of the contactors, a timer for effecting a predetermined delay in the operation of each contactor after the operation of its preceding contactor, a timer control relay for selectively causing the system to operate with an initial predetermined time delay or without an initial predetermined time delay upon starting operation of the contactors, a switch for rendering the timer control relay effective or ineffective and a fast relay and a slow relay responsive to an external means for operating the control relays to effect operation of the contactors to cause an increase or decrease in the speed of the motor to maintain the external means in its selected predetermined condition.

4. In a motor control system, an electric motor, a plurality of resistors connected in circuit with the motor, a plurality of contactors for controlling the connection of the resistors in the motor circuit to control the speed of the motor, a regulator adjustable to a predetermined value, a fast control means responsive to operation of the regulator when it operates below said predetermined value for operating the contactors to increase the speed of the motor while the regulator operates below said predetermined value, a slow control means responsive to operation of the regulator when it operates above said predetermined value for operating the contactors to decrease the speed of the motor while the regulator operates above said predetermined value, a plurality of sequence devices responsive to operation of the fast control means and the contactors for causing the operation of the contactors to follow a predetermined closing sequence in increasing the speed of the motor and responsive to operation of the slow control means and the contactors for causing the operation of the contactors to follow a predetermined opening sequence in decreasing the speed of the motor, and a timer for delaying each sequential operation of a contactor for a predetermined period.

5. In a motor control system, an electric motor, a plurality of resistors connected in circuit with the motor, a plurality of contactors for controlling the connection of the resistors in the motor circuit to control the speed of the motor, a regulator adjustable to a predetermined value, a fast control means responsive to operation of the regulator when it operates below said predetermined value for operating the contactors to increase the speed of the motor while the regulator operates below said predetermined value, a slow control means responsive to operation of the regulator when it operates above said predetermined value for operating the contactors to decrease the speed of the motor while the regulator operates below said predetermined value, a plurality of sequence devices responsive to operation of the fast control means and the contactors for causing the operation of the contactors to follow a predetermined closing sequence in increasing the speed of the motor and responsive to operation of the slow control means and operation of the contactors for causing the operation of the contactors to follow a predetermined opening sequence in decreasing the speed of the motor, a timer for delaying each sequential operation of a contactor for a predetermined period, and a timer control device responsive to operation of the control means for rendering the timer ineffective to delay the first contactor to be operated in an opening sequence or in a closing sequence.

6. In a motor control system, an electric motor, a plurality of resistors connected in circuit with the motor, a plurality of contactors for controlling the connection of the resistors in the motor circuit to control the speed of the motor, a regulator adjustable to a predetermined value, a fast control means responsive to operation of the regulator when it operates below said predetermined value for operating the contactors to increase the speed of the motor while the regulator operates below said predetermined value, a slow control means responsive to operation of the regulator when it operates above said predetermined value for operating the contactors to decrease the speed of the motor while the regulator operates above said predetermined value, a plurality of sequence devices responsive to operation of the fast control means and the contactors for causing the operation of the contactors to follow a predetermined closing sequence in increasing the speed of the motor and responsive to operation of the slow control means and the contactors for causing the operation of the contactors to follow a predetermined opening sequence in decreasing the speed of the motor, a timer for delaying each sequential operation of a contactor for a predetermined period, a timer control device responsive to operation of the control means for rendering the timer ineffective to delay the first contactor to be operated in an opening sequence or in a closing sequence, and a manually controlled switch for disconnecting the timer control device from the system.

7. In a motor control system, an electric motor, a plurality of resistors disposed in a circuit with the motor, a plurality of contactors for controlling the connection of the resistors in the motor circuit to control the speed of the motor, a regulator adjustable to a selected point, a pair of time delay relays and an assisting relay for controlling the operation of the contactors, a fast means responsive to operation of the regulator below the selected predetermined point for operating the two time delays to cause operation of the contactors in increasing the speed of the motor, a slow means responsive to operation of the regulator above the selected predetermined point for operating one of the time delay relays and the assisting relay for operating the contactors to decrease the speed of the motor, means for causing the operation of the contactors to follow predetermined sequences, and a timer for effecting a predetermined time delay in each sequential operation of the contactors.

JEAN V. KRESSER.